United States Patent Office 3,088,958
Patented May 7, 1963

3,088,958
CHROMIUM COMPLEXES OF PERFLUOROETHER ACIDS, ARTICLES COATED THEREWITH AND A PROCESS FOR THEIR PREPARATION
Herbert S. Eleuterio, New Castle County, Del., assignor to E. I. du Pont de Nemours and Company, Wilmington, Del., a corporation of Delaware
No Drawing. Filed Nov. 3, 1960, Ser. No. 66,907
10 Claims. (Cl. 260—438)

This invention relates to chromium complexes. More particularly this invention relates to chromium complexes of perfluoroether acids, to methods employing the complexes and to articles treated with the complexes.

The chromium complexes of this invention are Werner type coordination chromium complexes of perfluoroether acids in which the perfluoroether acids have the formula

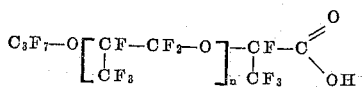

where $n$ is a positive integer from 1 to 6 inclusive.

While any of the chromium complexes within the scope of the formula shown above can be used in the methods and articles of this invention it is preferred that $n$ in the above formula be a positive integer from 1 to 4 inclusive. Not only can each individual acid be used to form a complex of this invention but chromium complexes of mixtures of the acids can be used. The acids can be mixed in any desired ratio or percentage. Mixtures of complexes of the individual acids can also be employed in the methods and articles of this invention. Any number of complexes can be employed and the percentage of each in the composition can be any ratio that is desired.

Similarly, the chromium complexes of this invention can be combined in any desired ratio with chromium complexes of other carboxylic acids, particularly perfluoroalkyl monocarboxylic acids having from 4 to 12 carbon atoms. It is most preferred that the perfluoroalkyl monocarboxylic acid be perfluorooctanoic acid.

The perfluoroalkyl monocarboxylic acids can be prepared as described in Olson U. S. Patent 2,693,458.

The chromium complexes of perfluoroether acids can be prepared by any of the known processes for preparing chromium complexes. Illustrative of these are Iler U.S. Patents 2,273,040; 2,356,161; 2,524,803; and 2,683,156 in which is described processes for producing a basic chromic chloride and in turn producing Werner type chromium complexes.

Iler Patent 2,524,803 teaches a process in which an aqueous solution containing, by weight, from 12 to 35 percent of chromium trioxide and more than 16 percent of hydrogen chloride is mixed with a solution of a monohydric aliphatic alcohol containing not more than 4 carbon atoms. Thereafter, the resulting solution can be mixed with a carboxylic acid to produce complex compounds of the Werner type.

The processes described in U.S. 2,273,040 and U.S. 2,356,161 effect the reaction between a carboxylic acido group and a basic trivalent chromium salt in a nonaqueous solvent such as carbon tetrachloride. Lower alcohols can also be used. The ultimate product obtained from these processes have to be freed of solvent preparatory for use in aqueous dispersion of solution.

Iler Patent 2,683,156 describes a process in which chromium trioxide, hydrogen chloride and sulfuric acid of at least 68 percent (by weight) strength are mixed to produce anhydrous chromyl chloride. The resulting chromyl chloride is separated from sulfuric acid and the anhydrous chromyl chloride is reacted with a lower monohydric aliphatic alcohol to produce a basic chromic chloride. Optionally, contact is effected between the basic chromic chloride so produced and a carboxylic acido group, whereby a complex compound of the Werner type is produced.

Whereas these and other processes can be employed to prepare the novel chromium complexes of this invention, it is preferred that the complex be made by a reaction in solution between the perfluoroether acid groups and a basic chromium salt of a monobasic acid, preferably basic chromic chloride. It is preferred to carry out the reaction by refluxing the ingredients in a solvent such as isopropanol for a period of 5 to 30 minutes although these conditions are not critical.

The perfluoroether acids used in the manufacture of the novel chromium complexes are prepared as shown in Earl P. Moore et al., U.S. patent application Serial No. 858,308, filed December 9, 1959 and assigned to the same assignee as the present invention.

These perfluoroether acids are prepared generally by contacting hexafluoropropylene epoxide at a temperature within the range of −80° C. to 140° C. and a pressure within the range of 0.1 atm. to 5000 atm. with an initiator selected from activated charcoal and high energy, particularly ionizing radiation and recovering a polymer of hexafluoropropylene epoxide having acid fluoride end groups. These groups are then easily converted to carboxylic acid groups by methods generally used to convert acyl halides to carboxylic acids.

For the Werner complexes of this invention the ratio of chromium: acido groups can broadly vary from about 1:1 to 100:1. It is preferred that the ratio vary from about 2:1 to 10:1. A ratio of about 4:1, however, is most preferred. These ratios can be adjusted by a selection of reactants in processes such as shown in Goebel and Iler Patent 2,544,668, or Werner complexes having a low ratio of chromium to acido groups can be given an effectively higher ratio of chromium to acido groups by the addition thereto and combinations therewith of basic chromic chloride.

It is preferred that the basicity of the chromium complex should not be greater than 50%, with the most preferred basicity being 33⅓%. The percentage of basicity of the salt can be defined as a measure of the extent to which hydroxyl ions have replaced the anions of the monobasic acid in the chromic salt. For instance, chromic chloride hexahydrate, $CrCl_3 \cdot 6H_2O$, is a chromic salt of the monobasic acid hydrogen chloride having a basicity of 0%. When the hydroxyl group replaces one of the chlorine atoms a basic salt, $Cr(OH)Cl_2 \cdot 6H_2O$ is formed and since one-third of the anionic groups of the monobasic acid has been replaced, this composition is said to be 33⅓% basic. Similarly, if two of the chlorine atoms had been replaced, the compound would be 66⅔% basic. In the present case the basicity of the chromium complex is preferably less than 50% regardless of whether the salt is added as such or is formed in situ by the reduction of a hexavalent chromium compound. So long as there is any basicity the Werner complex compounds will form, so that the basicity can be only a fraction of 1% if desired.

The materials which can be treated with the chromium complexes according to the process of this invention are materials having a negatively charged surface. Such materials are characterized by containing a substantial proportion, that is, above about 5%, of an element selected from the group consisting of oxygen and nitrogen. These elements can be present in highly polar groups, such as OH, $NH_2$, —COC—, —NH—, C—O, COOH, and $SO_3H$. Thus, there are included as materials having negatively charged surfaces ceramic materials, vitreous masses, glass, cellulose (such forms as wood, paper, cotton, hemp, cellophane, rayon, and cellulose acetate), and polyamide materials such as wool, silk, gelatin, synthetic protein fibers, leather, and hides. Also included are solid materials bearing oxide or hydroxide film such as can occur on metals.

The complexes of this invention are preferably applied to the surface to be treated from a dilute aqueous solution, preferably in the range of 0.1 to 10% of the complex commodity in water. It is most preferred that the concentration of the complex commodity in water be less than 1%. The aqueous solution is preferred since in order for the surface coating to be reasonably permanent, it is necessary for the complex to undergo a certain amount of hydrolysis. The complex can be applied from an hydrous organic solvent such as ethyl alcohol although this procedure is not preferred.

The treating solution can be applied to the surface to be rendered hydrophobic and oleophobic in any suitable manner such as by spraying, brushing or dipping the surface into a quantity of the solution. In treating textiles and similar materials a preferred procedure comprises passing a length of the material into a treating bath containing the desired concentration of complex and then through squeeze rolls to adjust the liquid pickup of the material.

Once applied to the surface, the complex is selfcuring and will harden to an insoluble state in one to two days at room temperature. If possible, however, it is preferred to dry the treated surface at an elevated temperature of at least 200° F. most preferably in the range of 200 to 250° F., to obtain optimum fixation of the complex on the surface.

*Example 1*

Chrome complex of a fluoroether acid having the formula $C_3F_7OCF(CF_3)CF_2OCF(CF_3)COOH$ and having a chromium to carboxylic acid mole ratio of 4:1 is prepared as follows: To 49.6 grams of basic chromic chloride having a chromium content of 7.61%, a chloride content of 10.48%, and a water content of 3.36% is added 9 grams of the perfluoroether acid and 29.2 grams of isopropanol. This mixture is poured in a glass round-bottomed flask fitted with a heating mantle and a reflux condenser, heated to reflux at 79° C., and held for 10 minutes at the reflux temperature. After cooling, the complex is found to be dispersible in water to give a clear solution.

*Example 2*

A chrome complex of a mixture of perfluoroether acids given by the following formula

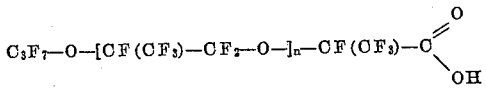

where $n$ is 1, 2, and 3, and having a chromium to carboxylic acid mole ratio of 4:1 is prepared as follows: To 15.0 grams of a basic chromic chloride containing 7.61% chromium, 10.48% chloride, and 3.36% water is added 4.5 grams of the perfluoroether acid mixture and 7.0 grams of isopropanol. This mixture is refluxed for 10 minutes at 79° C. and cooled to room temperature. The complex gives a clear solution in isopropanol and a slightly cloudy solution in water.

*Example 3*

To demonstrate the use of the chrome complexes prepared in Examples 1 and 2 as oleophobic and hydrophobic treatments for substrates, samples of cotton duck, poplin cloth and waterleaf paper are treated with solutions of the complexes as follows: To prepare solutions having equal amounts of perfluoro acids, 23.4 grams of the complex prepared in Example 1 is dissolved in 2977 grams of water and 9.4 grams of the chrome complex prepared in Example 2 is dissolved in 1991 grams of water. The solutions are used to treat cotton duck, poplin, and waterleaf paper by immersing the substrate in the solution for 20 seconds, wringing with a rubber-rolled wringer and drum drying at a surface temperature of 240° F.

After conditioning, the treated substrates are tested for hydrophobicity and oleophobicity by placing drops of water and various oils on the surface of the substrates and observing the wetting characteristics. The samples of cloth and paper treated with the chrome complexes of the perfluoroether acids prepared in Examples 1 and 2 demonstrate outstanding oleophobicity and hydrophobicity.

*Example 4*

A chrome complex of a mixture of acids containing perfluorooctanoic acid and a mixture of perfluoroether acids having the following formula $$CF_3CF_2CF_2O[CF(CF_3)CF_2O]_nCF(CF_3)COOH$$

where $n$ equals 2, 3, and 4 and is prepared as follows: To 49.7 grams of basic chromic chloride having a chromium content of 7.61%, a chloride content of 10.48%, and a water content of 3.36% is added 5 grams of perfluorooctanoic acid, 5 grams of the mixture of perfluoroether acids, described above, and 87 grams of isopropanol. This mixture is heated at reflux at 79° C. for 10 minutes and cooled to room temperature.

Paper and cloth are treated with the above chrome complex as described in Example 3. Upon testing with water and with oils, the treated substrates are found to exhibit outstanding oleophobicity and hydrophobicity.

*Example 5*

Equal amounts of the chrome complex of the mixture of perfluoroether acids prepared in Example 2 and a chrome complex of perfluorooctanoic acid having a chromium to acid mole ratio of 4:1 are mixed and used to treat paper and cloth as outlined in Example 3. The treatment is found to impart excellent oleophobicity and hydrophobicity to the substrates.

What is claimed is:

1. A composition comprising complexes of the Werner type in which trivalent nuclear chromium atoms are coordinated with a mixture of perfluoro ether acids having the formula

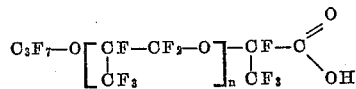

where $n$ is a positive integer from 1 to 4 inclusive.

2. A composition comprising a mixture of complexes of the Werner type in which trivalent nuclear chromium atoms are coordinated with a perfluoro ether acid having the formula

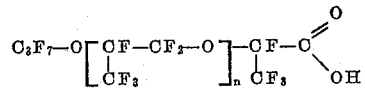

where $n$ is a positive integer from 1 to 4 inclusive.

3. A composition comprising a mixture of complexes of the Werner type in which trivalent nuclear chromium atoms are coordinated with perfluoro ether acids having the formula

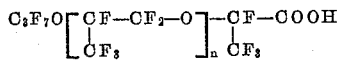

where $n$ is a positive integer from 1 to 6 inclusive and perfluoroalkyl monocarboxylic acids having from 4 to 12 carbon atoms.

4. An article having hydrophobic and oleophobic properties and characterized by the presence on its surface of a coating of the compound of claim 1.

5. An article having hydrophobic and oleophobic properties and characterized by the presence on its surface of a coating of the composition of claim 2.

6. In a process for increasing the hydrophobic and oleophobic properties of a negatively-charged surface, the steps comprising: effecting contact of the surface with a water solution of the compound of claim 1 and drying said surface to insolubilize said compound of claim 1 on said surface.

7. In a process for increasing the hydrophobic and oleophobic properties of a negatively-charged surface, the steps comprising: effecting contact of the surface with a water solution of the composition of claim 2 and drying said surface to insolubilize said compound of claim 2 on said surface.

8. A composition comprising complexes of the Werner type in which trivalent nuclear chromium atoms are coordinated with a mixture of perfluoro ether acids having the formula

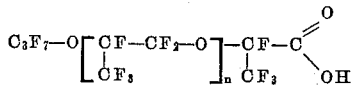

where $n$ is a positive integer from 1 to 6 inclusive.

9. An article having hydrophobic and oleophobic properties and characterized by the presence on its surface of a coating of the composition of claim 8.

10. In a process for increasing the hydrophobic and oleophobic properties of a negatively-charged surface, the steps comprising: effecting contact of the surface with a water solution of the compound of claim 8 and drying said surface to insolubilize said compound of claim 8 on said surface.

References Cited in the file of this patent
UNITED STATES PATENTS

| | | |
|---|---|---|
| 2,662,835 | Reid | Dec. 15, 1953 |
| 2,693,458 | Olson | Nov. 2, 1954 |
| 2,713,593 | Brice | July 19, 1955 |